ns patent office
2,778,853
Patented Jan. 22, 1957

2,778,853

DEAMINATION PROCESS

Everett M. Schultz, Broad Axe Village, Ambler, Pa., assignor to Merck & Co., Inc., a corporation of New Jersey No Drawing. Application September 10, 1952,
Serial No. 308,931

2 Claims. (Cl. 260—590)

This invention concerns a novel method for the deamination of addition salts of beta-tertiary amino ketones.

In the past, many difficulties have been encountered in deaminating beta-tertiary amino ketones. The prior art methods for deaminating salts of beta-tertiary amino ketones involved several steps which were not only time consuming, but resulted in low yields of the ketone sought. The most widely used deamination procedure comprised decomposing the beta-tertiary amino ketone (I) into an unsaturated ketone (II) and a secondary amine salt by steam distillation or dry distillation. The unsaturated ketone thus obtained was then hydrogenated catalytically yielding the next higher homolog (III) of the ketone employed in the preparation of the beta-tertiary amino ketone. The following reaction formulae illustrate this method. Reaction (A) illustrates a method for the production of the beta-tertiary amino ketone, and reactions (B) and (C) illustrate the deamination procedure previously employed.

(A)
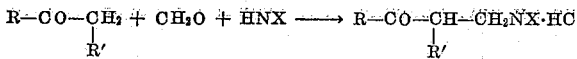

(B)
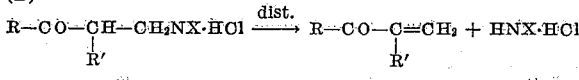

(C)
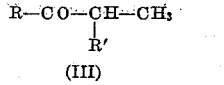

The process of deaminating the beta-tertiary amino ketone by steam distillation is very time consuming especially when this method is employed with compounds producing ketones of high molecular weight and which have, therefore, a low volatility with steam. In addition to the length of time required to complete this step, a further disadvantage is that much of the vinyl ketone (II) that is produced is frequently lost through polymerization during distillation. Furthermore, a second step, hydrogenation, is still required in order to obtain the homologous ketone (III). Hence, the procedure requires considerable time and the yields in most instances are quite low.

The applicant of the present invention has discovered a simple, one-step method for the deamination of beta-tertiary amino ketones that provides a good yield of the homologous ketone (III) and overcomes all of the disadvantages of the methods heretofore employed for this purpose. According to this novel process, an addition salt of a beta-tertiary amino ketone is submitted to hydrogenolysis over Raney nickel. Advantageously, the compound to be deaminated is dissolved or suspended in an organic solvent and the hydrogenation is conducted at elevated pressure and temperature. Any salt of the beta-tertiary amino ketone can be employed provided it is not susceptible to reduction under the reaction conditions and will not poison or inactivate the catalyst. Examples of such salts are those formed with mineral acids as the hydrohalides, e. g. hydrochloride, sulfates, phosphates, and the like, or organic acids as acetic acid, and the like. Suitable solvents are those which will not be effected by catalytic hydrogenation conditions and which will not exert an inactivating effect upon the catalyst. Such solvents are advantageously organic solvents as lower alkyl carbinols, dioxane and the like. Preferably absolute ethanol is employed. The pressure and temperature at which the reaction takes place will be governed somewhat by the beta-tertiary amino ketone employed. It has been found that pressures between about 60 to 100 atmospheres and temperatures between about 80 to 100° C. and preferably at about 80° C. usually give the maximum yield of ketone (III) in a reasonably short period of time.

Under these reaction conditions, one mole of hydrogen per mole of beta-tertiary amino ketone is absorbed at a moderate rate and then the consumption of hydrogen ceases. Of course, if the beta-tertiary amino ketone contains an olefinic double bond, additional hydrogen will be consumed to saturate the compound. The products of the reaction are the homologous ketone (III) and the addition salt of the secondary amine (IV). This novel procedure can be represented structurally as follows:

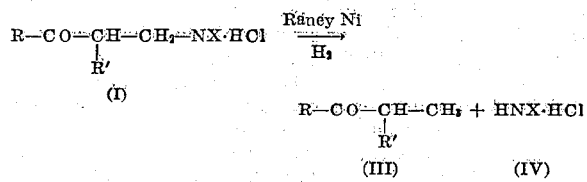

The reaction mixture, when freed of catalyst, is usually green due to dissolved nickel compounds; occasionally it is colorless. In any event, the color can be removed readily in the subsequent purification. The ketones obtained are colorless, they possess very sharp boiling points and almost uniformly yield derivatives that reach a maximum melting point after one recrystallization. Hence, the ketones produced are very pure.

In general, any addition salt of a beta-tertiary amino ketone having as an essential portion of its molecule the radical

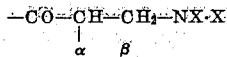

can be deaminated by the process of the invention. Substantially any group can be attached to the carbonyl- and α-carbon atoms of the above radical, and NX·Y can be an addition salt of any secondary amine radical, provided in each instance no group or combination of groups are present which will be effected by the catalytic hydrogenation conditions employed in the reaction or which will exert an inactivating effect upon the catalyst. Of course, if it is desired to have a substituent attached to either or both of the carbonyl- and α-carbon atoms which can be removed by catalytic hydrogenolysis in addition to deaminating the beta-tertiary amino ketone, then it only would be necessary to observe that these substituents are not of the type which would inactivate the catalyst. In addition, the unsatisfied valence bond attached to the α-carbon atom can be satisfied with hydrogen.

In particular, compounds having the general formula

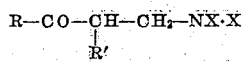

wherein R is an aliphatic, aromatic, araliphatic or heterocyclic radical; R' is hydrogen or an aliphatic, aromatic, araliphatic, or heterocyclic radical; NX is a secondary amine radical wherein the nitrogen atom is either attached to two discrete groups or is contained in a heterocyclic ring structure; and Y is a salt forming acid, can be deaminated by the novel process of this invention. In practice it will be found that the compounds which will be most frequently deaminated by this process, and which have been found to undergo deamination most smoothly and with good yields of homologous ketone, are compounds of the above general formula wherein R is a substituted- or unsubstituted-alkyl or -alkyenyl radical, advantageously those of low molecular weight, a substituted- or unsubstituted-aryl or -aralkyl radical, and preferably a mononuclear-aryl or -aralkyl radical. Suitable substituents which can be attached to any one or more of the above groups advantageously can be alkyl, alkenyl, aryl, aralkyl, hydroxy, alkoxy, or any group or groups which will not be removed by the catalytic hydrogenation conditions of the reaction and will not inactivate the catalyst. Illustrative examples of the groups represented by R are methyl, normal- or iso-propyl, normal- or iso-butyl, vinyl, allyl, 1,2-diphenylethyl, phenyl, hydroxyphenyl, methoxy-phenyl, benzyl, styryl, and similar groups; R' is hydrogen or an alkyl, aryl, or aralkyl radical, similarly substituted or unsubstituted in the manner described above for R, and advantageously those groups wherein the alkyl radical or portion of the radical is lower alkyl. Examples of these groups are methyl, propyl, phenyl, hydroxy-phenyl, methoxy-phenyl, benzyl, styryl, phenethyl, and the like; NX is a secondary-amine radical derived from a dialkyl amine, piperidine, morpholine and the like; and Y is a salt forming acid derived from the mineral acids or strong organic acids such as a hydrohalic acid, sulfuric acid, phosphoric acid, acetic acid, and the like. Beta-tertiary amino ketones having a variety of structures have been employed in this process and in all cases deamination occurred and a good yield of the homologous ketone (III) was obtained. The age of the Raney nickel catalyst employed or the use of catalyst from different preparations did not influence the result of the reaction.

The process of the present invention provides a more economical means to synthesize ketones of increased chain length via beta-tertiary amino ketones. It is also useful in determining the structures of beta-tertiary amino ketones, since from the structure of the homologous ketone, which can be determined easily, the structure of the beta-tertiary amino ketone can be established.

The following examples illustrate the process of this invention. It is to be understood that the invention is not limited to the specific conditions recited therein as many variations and modifications can be made without departing from the scope of the invention.

Example 1.—Deamination of 4-dimethylamino-1,1-diphenyl-2-butanone hydrochloride.—The above mentioned hydrochloride (30.3 grams, 0.1 mole) was suspended in absolute ethanol (150 ml.) and Raney nickel in absolute ethanol (¼ teaspoonful) was added. The mixture was sealed into a stainless-steel lined hydrogenation autoclave. Hydrogen was introduced to a pressure of 1,180 pounds per square inch (approximately 80.5 atmospheres) and the autoclave was rocked for about three minutes to saturate the solvent with hydrogen. The temperature then was raised to 80° C. and rocking was resumed. Hydrogen absorption commenced at once and ceased after two and one-half hours when 0.1 mole of hydrogen had been consumed. After removal of the catalyst by filtration, the alcohol was evaporated on a steam bath. The residue on cooling consisted of a mixture of a dark oil and white crystals of dimethylamine hydrochloride. Water was added to dissolve the amine salt and the oil was extracted with ether. The greenish-brown ether layer was washed with 5% hydrochloric acid and with 5% sodium hydroxide solution whereupon the color was extracted to the aqueous phase and the ether layer became pale yellow. The ether layer was separated and dried over sodium sulfate. The ether then was evaporated and the residue distilled yielding 72% of 1,1-diphenyl-2-butanone, boiling point 125–127° C. at 1.5 mm. pressure.

Deamination of the above beta-tertiary amino ketone also occurs when the absolute ethanol is replaced by an equal quantity of dioxane and following substantially the same procedure described in Example 1, with the added exception that following completion of the hydrogenation, the dioxane is removed by adding the filtered reaction mixture to a sufficient amount of water to dissolve the dioxane and amine salt and extracting the ketone into ether. A good yield of 1,1-diphenyl-2-butanone, having the same boiling point given for it above, is thus obtained. Isolation of the homologous ketone can also be effected by evaporating the dioxane under reduced pressure and working up the residue in the same manner described in Example 1 following the step wherein the alcohol is removed.

Deamination of 4-dimethylamino-1,1-diphenyl-2-butanone hydrochloride also occurred by following the procedure described in Example 1 and conducting the hydrogenation at about 60 atmospheres and at 100° C. Approximately the same yield of 1,1-diphenyl-2-butanone, having the same boiling point given for it above, was obtained.

By substituting 0.1 mole of the beta-tertiary amino ketone hydrochloride identified in each of the examples below for the 4-dimethylamino-1,1-diphenyl-2-butanone hydrochloride employed in Example 1, and following substantially the same procedure described therein, deamination occurred in each instance and homologous ketones, in the yields given in the following examples, were obtained:

Example 2.—Deamination of 4-dimethylamino-1-phenyl-1-methyl-2-butanone hydrochloride produced a 73% yield of 1-phenyl-1-methyl-2-butanone having a boiling point of 106–107° C. at 14 mm. pressure, $n_D^{25}$ 1.5030.

Example 3.—Deamination of 4 - dimethylamino - 1-phenyl - 1 - ethyl - 2 - butanone hydrochloride produced a 70% yield of 1 - phenyl - 1 - ethyl - 2 - butanone, boiling point 113–114° C. at 13 mm. pressure, $n_D^{25}$ 1.5000.

Example 4.—Deamination of 4 - dimethylamino - 1-phenyl - 1 - n - propyl - 2 - butanone hydrochloride produced a 72% yield of 1 - phenyl - 1 - n - propyl - 2-butanone, boiling point 125° C. at 14 mm. pressure, $n_D^{25}$ 1.4961.

Example 5.—Deamination of 4 - (1 - piperidyl) - 1-phenyl - 1 - n - propyl - 2 - butanone hydrochloride produced an 86% yield of 1 - phenyl - 1 - n - propyl - 2-butanone having the same physical constants given for it in Example 4.

Example 6.—Deamination of 4 - dimethylamino - 1-phenyl - 1 - isopropyl - 2 - butanone hydrochloride produced a 96% yield of 1 - phenyl - 1 - iso - propyl - 2-butanone, boiling point 118–119° C. at 14 mm. pressure, $n_D^{25}$ 1.4943.

Example 7.—Deamination of 4 - (1 - piperidyl) - 1-phenyl - 1 - iso - propyl - 2 - butanone hydrochloride (which was catalytically hydrogenated at a temperature of 100° C., but otherwise by the same procedure described in Example 1) produced an 88% yield of 1 - phenyl-1 - iso - propyl - 2 - butanone having the same physical properties given for it in Example 6.

Example 8.—Deamination of 4 - dimethylamino - 1-phenyl - 1 - benzyl - 2 - butanone hydrochloride produced an 80% yield of 1 - phenyl - 1 - benzyl - 2 - butanone, boiling point 123–124° C. at 1.5 mm. pressure, $n_D^{25}$ 1.5548.

Example 9.—Deamination of 4 - dimethylamino - 3-methy - 1,1 - diphenyl - 2 - butanone hydrochloride produced at 51% yield of 3 - methyl - 1,1 - diphenyl - 2-butanone, melting point 72–73° C. after distillation at reduced pressure and crystallization from ligroin.

*Example 10.*—Deamination of 4 - dimethylamino - 1,1-diphenyl - 1 - benzyl - 2 - butanone hydrochloride produced a 57% yield of 1,1 - diphenyl - 1 - benzyl - 2-butanone, boiling point 167–170° C. at 1 mm. pressure; melting point 72–73° C. after crystallization from ligroin.

*Example 11.*—Deamination of 4 - dimethylamino - 3-phenyl - 2 - butanone hydrochloride produced an 86% yield of 3 - phenyl - 2 - butanone, boiling point 108–110° C. at 21 mm. pressure, $n_D^{25}$ 1.5243.

*Example 12.*—Deamination of 3 - dimethylamino - 1-phenyl - 1 - propanone hydrochloride produced a 56% yield of 1 - phenyl - propanone (propionphenone), boiling points 107° C. at 22 mm. pressure and 104° C. at 18 mm. pressure, $n_D^{25}$ 1.5091.

*Example 13.*—Deamination of 3 - dimethylamino - 1-(meta - hydroxy - phenyl) - 1 - propanone hydrochloride produced a 74% yield of 1 - (meta - hydroxyphenyl) - 1-propanone, melting point 75–77° C., after distillation under reduced pressure and crystallization from ligroin.

*Example 14.*—Deamination of 3 - dimethylamino - 1-anisyl - 1 - propanone hydrochloride produced a 73% yield of 1-anisyl-propanone, boiling point 151–152° C. at 16 mm. pressure.

*Example 15.*—Deamination of 3 - diethylamino - 1-styryl - 1 - propanone hydrochloride was conducted as follows: The ketoamine (20.1 grams, 0.075 mole) and 3 grams of Raney nickel were added to 100 ml. of absolute ethanol contained in the hydrogenation apparatus described in Example 1. Hydrogen was admitted to a pressure of 900 pounds per square inch at 29° C. The temperature was raised gradually while the autoclave was being rocked and after 45 minutes when the temperature had reached 80°, the theoretical amount of hydrogen (0.15 mole) had been consumed and the reaction was, therefore, complete. The reaction mixture was worked up as in Example 1 to obtain 9.5 grams (79%) of 1-phenyl-3-pentanone; boiling point 130–131° C. at 18 mm. pressure, $n_D^{25}$ 1.5068.

All melting points and boiling points are uncorrected.

While the invention has been described by certain specific examples, it is to be understood that variations, such as are described above, can be made in the reaction conditions and in the type of beta-tertiary amino ketone addition salt employed.

What I claimed is:

1. A process for the deamination of a beta-tertiary amino ketone having the general formula

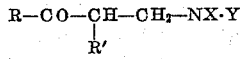

wherein R is selected from the group consisting of aliphatic, aromatic, and araliphatic radicals; R' is selected from the group consisting of hydrogen, aliphatic, aromatic, and araliphatic radicals; —NX is the residue of a secondary amine selected from the group consisting of dialkylamine and dialkylamines wherein the alkyl groups are linked to form a heterocyclic ring with the nitrogen atom, and Y is a salt forming acid selected from the group consisting of mineral acids and strong organic acids by hydrogenolysis over Raney nickel yielding a product having the general formula

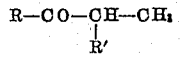

wherein R and R' have the meaning assigned above.

2. A process for the deamination of a beta-tertiary amino ketone according to claim 1, wherein the hydrogenolysis over Raney nickel takes place in the presence of an organic solvent and at elevated pressure and temperature.

References Cited in the file of this patent

UNITED STATES PATENTS 2,550,745    Wilder _____ May 1, 1951

OTHER REFERENCES

Adkins: "Reaction of Hydrogen, etc." 1937, pp. 90, 91, 96.